(12) United States Patent
Franzen et al.

(10) Patent No.: US 9,090,436 B2
(45) Date of Patent: Jul. 28, 2015

(54) HANDLING SYSTEM FOR ISO CONTAINERS HAVING A GANTRY CRANE

(75) Inventors: Hermann Franzen, Mönchengladbach (DE); Armin Wieschemann, Oberhausen (DE); Mike Hegewald, Oberhausen (DE); Jannis Moutsokapas, Monheim (DE)

(73) Assignee: Terex MPHS GmbH, Duesseldorf (DE)

( * ) Notice: Subject to any disclaimer, the term of this patent is extended or adjusted under 35 U.S.C. 154(b) by 0 days.

(21) Appl. No.: 13/505,940

(22) PCT Filed: Nov. 3, 2010

(86) PCT No.: PCT/EP2010/066724
§ 371 (c)(1),
(2), (4) Date: May 25, 2012

(87) PCT Pub. No.: WO2011/054856
PCT Pub. Date: May 12, 2011

(65) Prior Publication Data
US 2012/0243966 A1 Sep. 27, 2012

(30) Foreign Application Priority Data
Nov. 6, 2009 (DE) .......................... 10 2009 053 235

(51) Int. Cl.
*B63B 27/00* (2006.01)
*B66C 19/00* (2006.01)
*B65G 63/00* (2006.01)

(52) U.S. Cl.
CPC ............ *B66C 19/002* (2013.01); *B65G 63/004* (2013.01)

(58) Field of Classification Search
CPC .... B66C 19/002; B66C 19/007; B66C 17/20; B65G 63/025; B65G 63/004

USPC .......... 414/141.3, 141.7, 142.6, 142.8, 139.4, 414/137.1; 212/316, 319, 324, 325, 326
See application file for complete search history.

(56) References Cited

U.S. PATENT DOCUMENTS 2,831,588 A * 4/1958 Seed .............................. 414/341
(Continued)

FOREIGN PATENT DOCUMENTS

DE 19740814 A1 4/1999
(Continued)

OTHER PUBLICATIONS

International Search Report of the ISA from corresponding Patent Cooperation Treaty (PCT) Application No. PCT/EP2010/066724, mailed Feb. 4, 2011.
(Continued)

*Primary Examiner* — Saul Rodriguez
*Assistant Examiner* — Lynn Schwenning
(74) *Attorney, Agent, or Firm* — Gardner, Linn, Burkhart & Flory, LLP

(57) ABSTRACT

A handling system for ISO containers having a gantry crane and a loading and unloading area, in which transport vehicles can be driven in and out. The crane comprises a first traveling crane having a first crane boom on which a first crane trolley having a first toad receiving means can travel between a section on the water side and a section on the land side of the first crane boom, and a second traveling crane having a second crane boom disposed below the section on the land side of the first crane boom, on which a second crane trolley having a second load receiving means can travel, wherein containers can be transferred between the first and second traveling cranes. A passive transfer station is disposed on the second crane boom and the container can be transferred between the transfer station and a transport vehicle located in a loading and unloading area.

13 Claims, 5 Drawing Sheets

(56) References Cited

U.S. PATENT DOCUMENTS

| | | | |
|---|---|---|---|
| 3,247,974 A * | 4/1966 | Dechantsreiter | 414/591 |
| 3,638,810 A | 2/1972 | Mathew | |
| 3,812,987 A * | 5/1974 | Watatani | 414/561 |
| 4,358,020 A * | 11/1982 | Thiele | 212/276 |
| 5,089,972 A | 2/1992 | Nachman et al. | |
| 5,603,598 A * | 2/1997 | Hasegawa et al. | 414/140.3 |
| 5,775,866 A * | 7/1998 | Tax et al. | 414/140.3 |
| 5,810,183 A * | 9/1998 | Feider et al. | 212/291 |
| 6,349,793 B1 * | 2/2002 | Kincaid | 182/69.4 |
| 6,435,361 B2 | 8/2002 | Franzen et al. | |
| 7,665,945 B2 * | 2/2010 | Di Rosa | 414/140.4 |
| 8,128,064 B2 * | 3/2012 | Franzen et al. | 254/9 C |
| 8,157,492 B2 | 4/2012 | Franzen et al. | |
| 2002/0092820 A1 | 7/2002 | Chattey | |
| 2002/0100740 A1 * | 8/2002 | Amoss | 212/224 |

FOREIGN PATENT DOCUMENTS

| | | | | |
|---|---|---|---|---|
| DE | 19958501 A1 | | 6/2001 | |
| DE | 102007039780 A1 | | 2/2009 | |
| EP | 1820768 A1 | | 10/2005 | |
| EP | 1820768 | * | 8/2007 | B66C 19/00 |
| JP | 53-051877 | | 5/1978 | |
| JP | 62-205916 | | 9/1987 | |
| JP | 06-247540 | | 9/1994 | |
| JP | 9315759 A | | 12/1997 | |
| JP | 2008-516865 A | | 5/2008 | |
| WO | 96/09242 A1 | | 3/1996 | |
| WO | WO2008046728 | * | 4/2008 | B60P 1/64 |
| WO | WO2009024569 | * | 2/2009 | B60P 7/13 |

OTHER PUBLICATIONS

Written Opinion of the ISA from corresponding Patent Cooperation Treaty (PCT) Application No. PCT/EP2010/066724.

Translation of International Preliminary Examination Report from Corresponding PCT Application No. PCT/EP2010/066724.

* cited by examiner

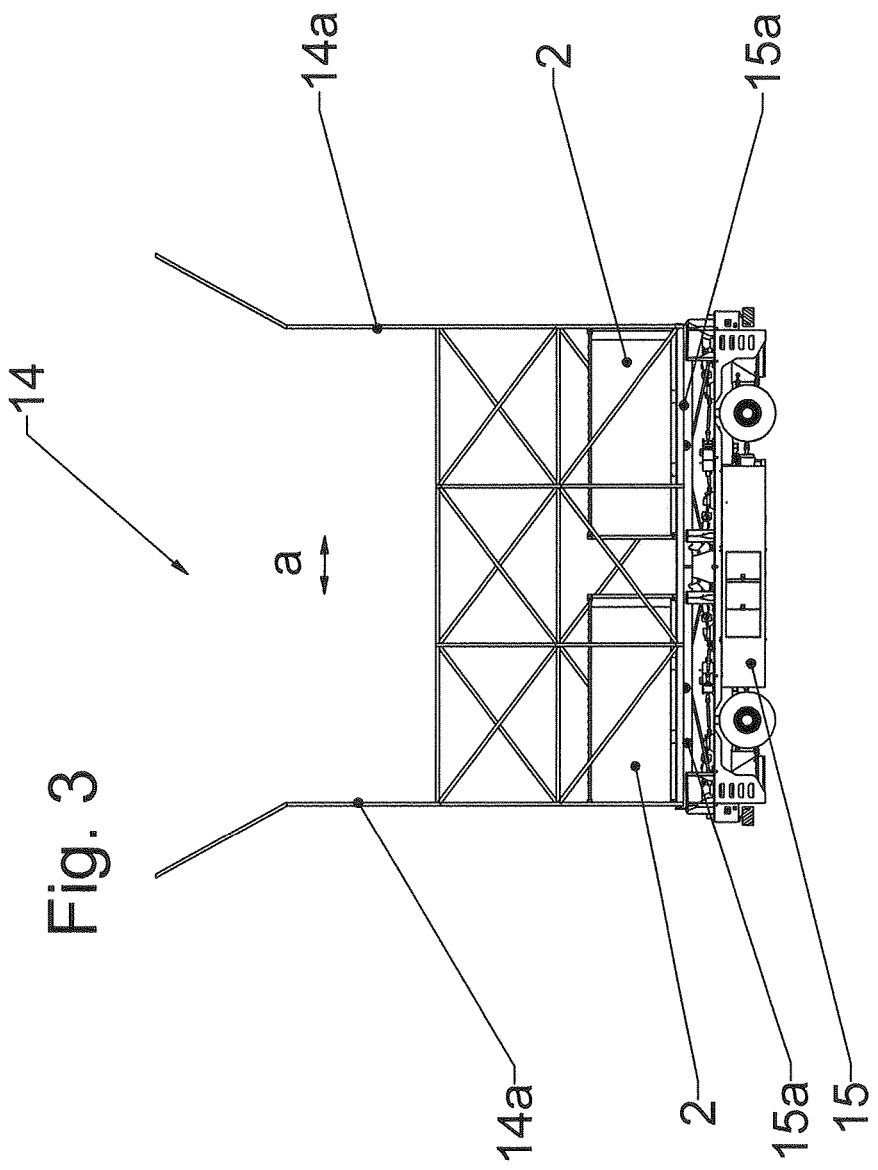

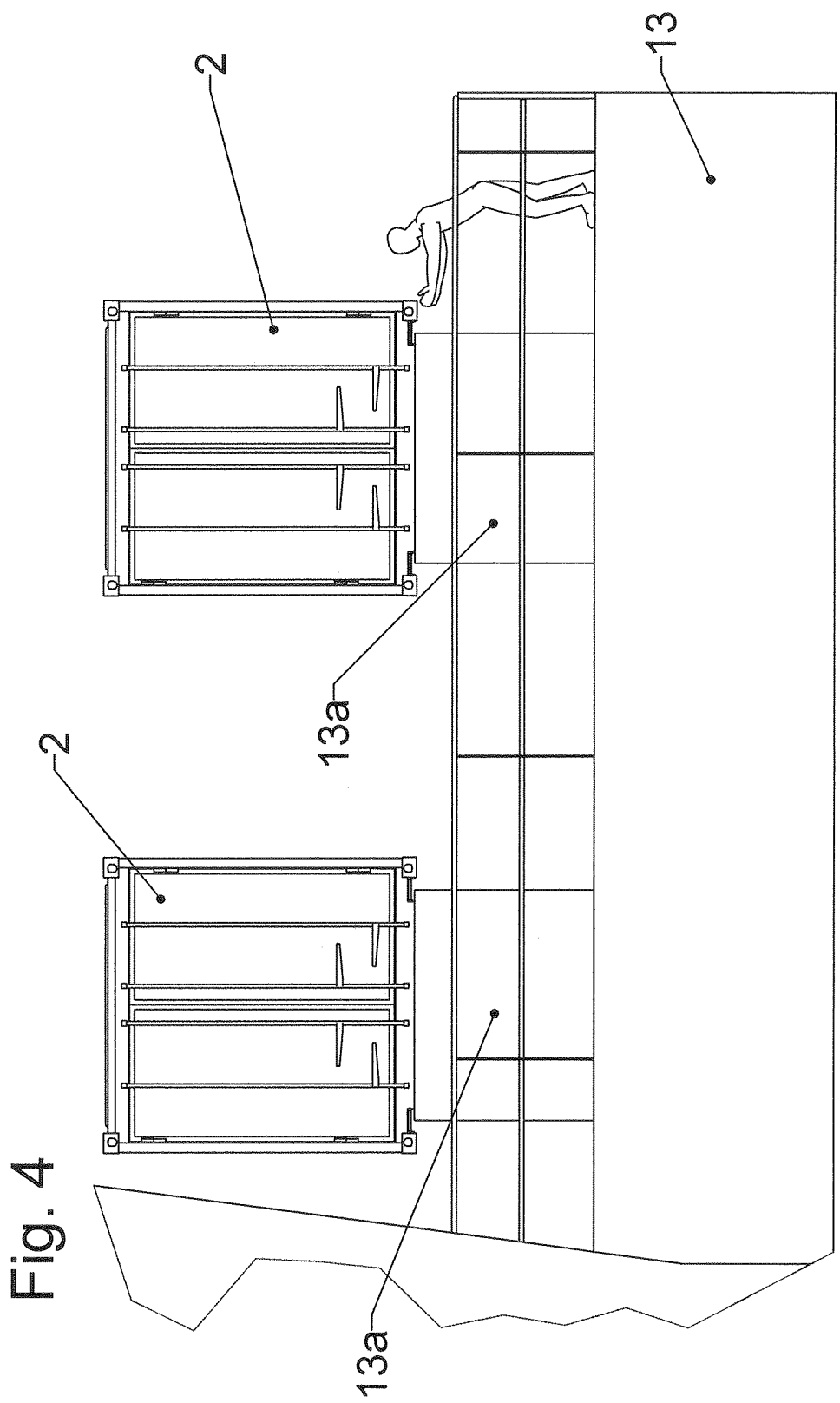

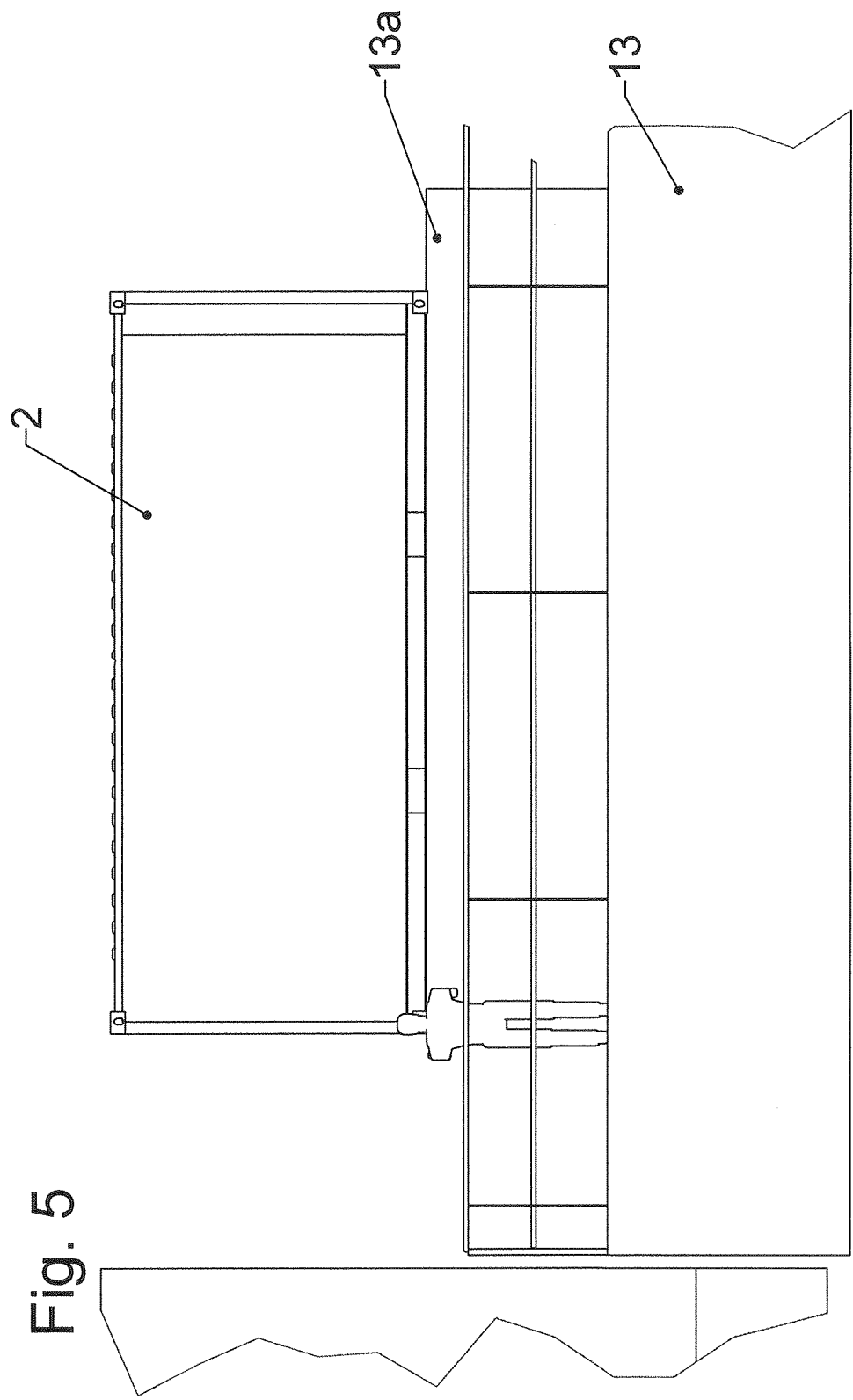

HANDLING SYSTEM FOR ISO CONTAINERS HAVING A GANTRY CRANE

CROSS REFERENCE TO RELATED APPLICATION

The present application claims the priority benefits of International Patent Application No. PCT/EP2010/066724, filed on Nov. 3, 2010, and also of German Patent Application No. DE 10 2009 053 235.8, filed on Nov. 6, 2009, which are hereby incorporated herein by reference in their entireties.

BACKGROUND OF THE INVENTION

The invention relates to a cargo handling system for ISO containers with a container bridge and a loading and unloading area adjoining the container bridge, into and out of which area transport vehicles for ISO containers can travel.

From the German laid-open document DE 199 58 501 A1, a container bridge for handling ISO containers between land and sea is known. In a conventional manner the container bridge consists of a gantry frame with supports disposed in the corners of an imaginary rectangle, of which two are disposed on the sea side and the other two on the land side. The gantry frame can travel along a quay on rails by means of travelling mechanisms disposed at the lower ends of the supports. The gantry frame supports a first crane boom which is orientated horizontally and transversely with respect to the direction of travel of the container bridge along the quay. The first crane boom has a sea-side portion which protrudes over a port basin adjoining the quay and over a ship which is lying at the quayside and is to be loaded or unloaded, and has a land-side portion which protrudes over the quay in the region of the gantry frame and an adjoining loading and unloading area. A first crane trolley is suspended on the first crane boom and can travel along the first crane boom, a first load-receiving means for the ISO containers being suspended on this crane trolley in such a way that it can be raised and lowered. Furthermore, a second crane trolley is provided on the container bridge, which can travel along a second crane boom which is orientated in parallel with the first crane boom and extends below the first crane boom. This boom is supported at the beginning and at the end in the region of the land-side and sea-side supports of the gantry frame. By means of the first crane trolley, an ISO container can be transported between the ship and the loading and unloading area and between the ship and the second crane trolley. For this purpose, the second crane trolley is formed in such a way that the ISO container can travel into the second crane trolley from above and can set down the ISO container on the second load-receiving means of the second crane trolley. The second load-receiving means is not suspended on the second crane trolley by means of cables but via telescopic guides. After the ISO container has been set down on the second load-receiving means, the second crane trolley is moved along the second crane boom in the direction of an automated guided vehicle waiting on the quay, and the ISO container is set down onto a loading platform of the guided vehicle by the second load-receiving means. Conversely, containers can also be picked up from the loading platform by the second load-receiving means.

SUMMARY OF THE INVENTION

The present invention provides a cargo handling system for ISO containers with a container bridge having a constructionally simplified structure but at the same time a good cargo handling capacity.

This object is achieved by a cargo handling system in accordance with the present invention.

In accordance with an embodiment of the invention in a cargo handling system for ISO containers with a container bridge and a loading and unloading area adjacent to the container bridge, into and out of which area transport vehicles for ISO containers can travel, in which the container bridge has a first travelling crane with a first crane boom, on which a first crane trolley with a first load-receiving means can travel between a sea-side portion and a land-side portion of the first crane boom, and has a second travelling crane with a second crane boom which is disposed below the land-side portion of the first crane boom and on which a second crane trolley with a second load-receiving means can travel, wherein ISO containers can be transferred between the first travelling crane and the second travelling crane, a constructionally simplified structure and at the same time a good cargo handling capacity is achieved in that a passive transfer point for an ISO container is disposed on the second crane boom, and the ISO container can be transferred between the transfer point and a transport vehicle standing in the loading and unloading area. In terms of the invention a passive transfer point is to be understood as a transfer point which consists only of a support frame for the ISO container, which is suspended on the second crane boom, wherein the support frame is not actively moveable in the vertical direction. Therefore in the transfer point an ISO container can be picked up from the transfer point or be set down therein only via the second load-receiving means or via a transport vehicle fitted with a lifting element.

In constructional terms, the transfer point may comprise L-shaped support arms which are suspended on the second crane boom and have a bearing arm in the region of their ends remote from the second crane boom, on which bearing arms an ISO container set down in the transfer point stands. The transfer point therefore does not have any complex drives.

In order to be able to co-operate with the passive transfer point, the transport vehicle has a lifting element with which the ISO container can be raised from the transfer point or lowered onto the transfer point.

In particular embodiments the lifting element is formed as a lifting platform, the transport vehicle with a lowered and empty lifting element can travel under the transfer point or the ISO container can be moved into the transfer point by the transport vehicle with a raised lifting element and the ISO container is thus located above the bearing arms.

Provision is made for the container bridge to be able to travel along rails in the longitudinal direction of the quay and for the transfer point to be orientated with its longitudinal extension in the longitudinal direction of the quay.

In order to improve the handling of the ISO containers, the second crane boom has a gantry-side portion facing the sea-side portion of the first crane boom and an adjoining loading area-side portion. The transfer point in the loading area-side portion of the second crane boom is attached to the second crane boom. The transport vehicles serving the transfer points can therefore travel outside the travel area of the container crane and therefore travel on the quay without crossing each other's path.

In order to increase the cargo handling capacity, a plurality of transfer points are suspended next to each other on the second crane boom as seen in the longitudinal direction of the quay.

In order to decouple the conveying movements of the two travelling cranes and therefore in order to further increase the cargo handling capacity of the container crane, it is ensured that in the region of the second travelling crane and below the second crane boom at least one intermediate storage point for ISO containers is disposed, onto or from which ISO containers can be set down or picked up by the first travelling crane and the second travelling crane.

The invention will be described in more detail hereinunder with the aid of an exemplified embodiment illustrated in the accompanying drawings.

BRIEF DESCRIPTION OF THE DRAWINGS

FIG. 3 is a side view of FIG. 2, FIG. 4 is an enlargement of a section of FIG. 1 from the region of an intermediate storage point and FIG. 5 is a side view of FIG. 4.

DESCRIPTION OF THE PREFERRED EMBODIMENTS

Figure 1:
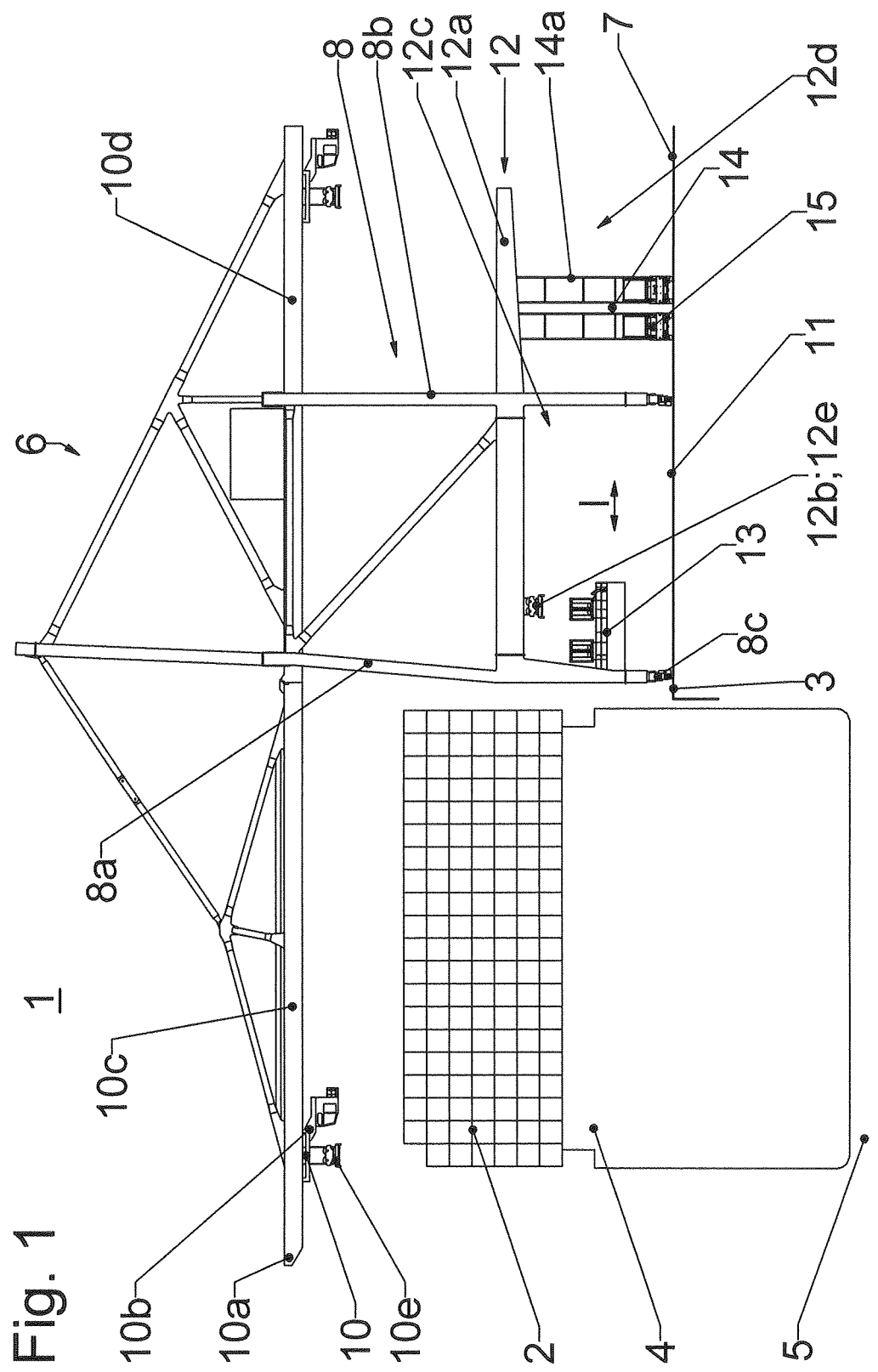
FIG. 1 is a view of a cargo handling system for ISO containers in accordance with the invention having a container bridge and a loading and unloading area adjoining the container bridge.

FIG. 1 shows a view of a cargo handling system 1 in accordance with an embodiment of the invention for ISO containers 2, with which the ISO containers can be transported between a quay 3 and a ship 4 lying at the quay 3. In a conventional manner the ship 4 is located in a port basin 5 which adjoins the quay 3. The cargo handling system 1 consists essentially of a container crane 6 and a loading and unloading area 7 adjoining the container crane 6 in the region of the quay 3.

In a conventional manner the container crane 6 has a gantry frame 8 with two sea-side supports 8a, which are mutually spaced as seen in a longitudinal direction of the quay 3 or in a travel direction of the container crane 6 along the quay 6, and land-side supports 8b which are also correspondingly spaced apart from each other and are disposed in the corner points of an imaginary rectangle. At the lower ends of the sea-side and land-side supports 8a, 8b are disposed travelling mechanisms 8c, by means of which the gantry frame 8 and therefore the whole container crane 6 can travel in the longitudinal direction of the quay 3 on rails which are disposed on the quay 3 and are not illustrated. In the region of the upper ends of the sea-side and land-side supports 8a, 8b, remote from the travelling mechanisms 8c, a first crane boom 10a of a first travelling crane 10 is attached, which is orientated essentially horizontally and extends at a right angle to the longitudinal direction of the quay 3. A first crane trolley 10b can travel along the first crane boom 10a. The first crane boom 10a can be notionally divided into a sea-side portion 10c and a land-side portion 10d. The sea-side portion 10c spans the port basin 5 and therefore the ship 4 lying at the quay 3 with the load consisting of stacked ISO containers 2. The land-side portion 10d of the first crane boom 10a spans the loading and unloading area 7 for the ISO containers 2 and a travel region 11 for the gantry frame 8 of the container crane 6 on the quay 3. The rails are also laid in this travel region 11.

In a conventional manner, the first crane trolley 10a has a lifting mechanism, not shown, on which a first load-receiving means 10e in the form of a spreader for the ISO containers 2 is suspended via lifting cables. By means of the first load-receiving means 10e, the ISO containers 2 can be picked up and set down. The first load-receiving means 10e can therefore reach, on the one hand, the ISO containers 2 stored on the ship 3 and, on the other hand, on the land side, can directly load ISO containers 2 onto transport vehicles, not shown, or pick them up from such.

In addition to the first travelling crane 10, a second travelling crane 12 is disposed in the region of the gantry frame 8 of the container crane 6 and therefore below the land-side portion 10d of the first crane boom 10a. This second travelling crane 12 also consists essentially of a second crane boom 12a, which is orientated at a right angle to the longitudinal direction of the quay 3 and extends horizontally. The second crane boom 12a is supported below the first crane boom 10a on the sea-side and land-side supports 8a, 8b of the gantry frame 8 and extends in parallel with this frame. A second crane trolley 12b can travel on this second crane boom 12a in the longitudinal direction thereof. This second crane trolley 12b in turn has a lifting mechanism, not shown, on which a second load-receiving means 12e in the form of a spreader for picking up and setting down ISO containers 2 is suspended via cables so as to be able to be raised and lowered. The second crane boom 12a can be divided into a gantry-side portion 12c, which spans the travel region 11 of the gantry frame 8 and extends between the sea-side and land-side supports 8a, 8b, and an adjoining loading area-side portion 12d which spans the loading and unloading area 7. In the region of the gantry-side portion 12c of the second crane boom 12a and adjoining the sea-side supports 8b an intermediate storage point 13 is disposed below the second crane boom 12a. This intermediate storage point 13 serves for intermediate storage of ISO containers 2 during a transfer between the first travelling crane 10 and the second travelling crane 12 or vice versa. This intermediate storage point 13 is disposed on the sea-side supports 8b and above the quay 3 and at a distance therefrom.

A procedure for discharging the ship 4 can, for example, be effected in the following manner. The first travelling crane 10 picks up a 40-foot or two 20-foot ISO containers 2 from the ship 4 by means of its first load-receiving means 10e, then lifts this ISO container 2 via its first crane trolley 10b in the direction of the first crane boom 10a and then travels along the first crane boom 10a in the direction of the land-side portion 10d. When the first crane trolley 10b has arrived above the intermediate storage point 13, the first load-receiving means 10e is lowered and the ISO container 2 is set down on the intermediate storage point 13. In the region of the intermediate storage point 13, twistlocks disposed on the underside of the ISO container 2 in the corners thereof can then also be manually removed. Then, after the load-receiving means 10e has been unlocked, the first load-receiving means 10e leaves the intermediate storage point 13 and is moved in the direction of the ship 4 in order to discharge the next ISO container 2. Subsequently to this, the second crane trolley 12b with its second load-receiving means 12e travels over the ISO container 2 now standing on the intermediate storage point 13, lowers the second load-receiving means 12e in the direction of this ISO container 2 and locks the second load-receiving means 12e to the ISO container 2. The ISO container 2 is then lifted by means of the second load-receiving means 12e out of the intermediate storage point 13 and is moved along the second crane boom 12a in the direction of the loading area-side portion 12d. In the loading area-side portion 12d of the second crane boom 12a, a plurality of transfer points 14 are disposed one behind the other as seen in the longitudinal direction 1 of the second crane boom 12a. These transfer points 14 consist essentially of vertical support arms 14a which are formed in an L shape as a whole and, at their lower end remote from the second crane boom 12a, have horizontally orientated and inwardly directed bearing arms 14b. The vertical support arms 14a therefore laterally define the transfer point 14 and, as seen in the longitudinal direction of the quay 3, are at a distance from each other which is slightly greater than the width of the ISO containers 2. In one transfer point 14 a plurality of opposing, inwardly directed bearing arms 14b are therefore provided in order to be able to receive 20-foot, 40-foot and 45-foot containers. The ISO container 2 is then lowered into the transfer point 14 by the second load-receiving means 10e and is lowered along the vertically orientated rigid support arms 14a downwards in the direction of the bearing arms 14b until the ISO container 2 comes to rest on the bearing arms 14b which are appropriate for the length of the ISO container 2. The second load-receiving means 12e is then unlocked and moved upwards out of the transfer point 14 along the support arms 14a. The distance between the opposing support arms 14a is selected such that the ISO containers 2 are sufficiently spaced with respect to the lateral support arms 14a during lowering and raising movements. The transfer point 14 is formed in a passive manner, i.e. in terms of the invention that means that the support arms 14a and the bearing arms 14b cannot be raised or lowered in the vertical direction. These transfer points 14 serve as further intermediate storage locations for the ISO containers 2 so that these can then be picked up by a transport vehicle 15 independently of the conveying movement of the second travelling crane 12.

The transport vehicle 15 is preferably formed as an automated guided vehicle with a lifting element 15a in the form of a lifting platform which can be raised and lowered in the vertical direction. The transport vehicles 15 travel in the longitudinal direction of the quay 3 into the loading and unloading area 7. Owing to the fact that the transport vehicles 15 are automated, these can be positioned automatically in a very precise manner below the ISO containers 2 standing in the transfer points 14. At that location they then come to rest in a transfer position. The lifting element 15a is then raised in the vertical direction upwards in the direction of the ISO containers 2. The lifting element 15a is formed narrower than the inwardly protruding bearing arms 14b and can therefore raise the ISO container 2 from the bearing arms 14b. The transport vehicle then travels with the raised lifting element 15a and ISO container 2 standing thereon in the longitudinal direction L of the quay 3, out of the transfer point 14 in the direction of the longitudinal extension a thereof. The transport vehicle 15 moves the ISO container 2 along the support arms 14a of the transfer point 14, which are disposed one behind the other as seen in the longitudinal direction L of the quay 3, and through between them. After the transport vehicle 15 has left the transfer point 14, the lifting element 14a is lowered and the transport vehicle 15 continues its travel with the ISO container 2 lowered.

The loading of a transfer point 14 with an ISO container 2 is effected in a corresponding manner but in the reverse order. Accordingly a transport vehicle 15 travels to a transfer point 14 in the longitudinal direction L of the quay 3. Shortly before reaching the transfer point 14 the transport vehicle 15 stops and the lifting element 14a, and therefore the ISO container 2 standing thereon, is raised in the vertical direction until the underside of the ISO container 2 arrives above the bearing arms 14b of the support arms 14a. The automatically guided transport vehicle 15 then travels into the transfer point 14, wherein the ISO container 2 is located above the bearing arms 14b. When the transport vehicle 15 has reached the transfer position, this vehicle stops and the ISO container 2 is set down onto the bearing arms 14b by lowering the lifting element 15a. The transfer points 14 change their position along the quay 3 together with the container crane 6 during the unloading or loading of the ship 4.

Since the container crane 6 moves in a stepped manner along the quay 3 during the discharge procedure or loading procedure, the loading and unloading area 7 also migrates along the quay 3. The transport vehicles 15 which can travel on the quay 3 can easily adapt to the displaced loading and unloading area 7.

Figure 2:
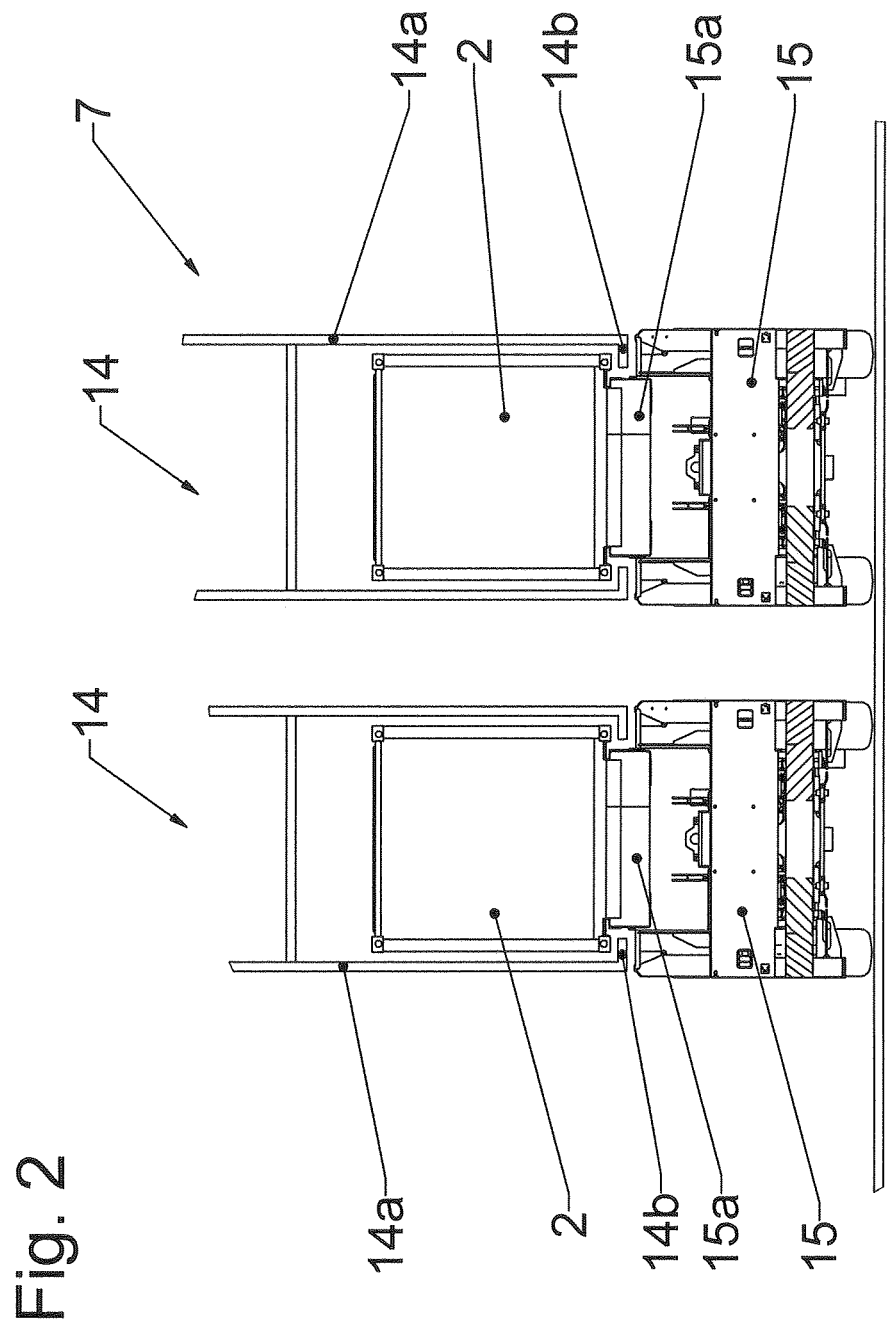
FIG. 2 is an enlargement of a section of FIG. 1 from the region of the loading and unloading area.

FIG. 2 shows an enlargement of a section of FIG. 1 from the region of the loading and unloading area 7. Two transfer points 14 can be seen which are disposed next to each other as seen in the longitudinal direction of the quay 3, the lower portion of the vertically orientated support arms 14a of these transfer points being shown, the lower end thereof being adjoined by the inwardly directed bearing arms 14b for receiving the ISO containers 2. An automated guided vehicle 15 with a raised lifting element 15a has traveled into both the transfer points 14, which means that the ISO container 2 can easily be located with its lateral and lower edge regions above the bearing arms 14b of the transfer points 14. With the lifting element 15a in this position, the transport vehicle 15, together with an ISO container 2, can be driven through the transfer points 14 as seen in the longitudinal direction of the quay 3. When the transport vehicle 15 with the raised lifting element 15a, and the ISO container 2 which is thus also raised, has arrived in the transfer position, the lifting element 15a is lowered so that in a first step the ISO container 2 is set down with its lateral edge regions on the bearing arms 14b and is then lowered further in the direction of the transport vehicle 15, which means that sufficient space is created between the underside of the ISO container 2 or the bearing arms 14b and the transport vehicle 15 or its lifting element 15a so that the transport vehicle 15 can travel out under the transfer point 14 in order to carry out further transportation tasks in the port. From this set-down position, the ISO container 2 can be further handled by the second travelling crane 12.

It is also fundamentally possible to suspend more than two or only one transfer point 14 on the second crane boom 1a.

FIG. 3 shows a side view of FIG. 2, wherein, on the transport vehicle 15 in the raised position, two 20-foot long ISO containers 2 are each located. It can be seen that the support arms 14a of the transfer point 14 are stiffened with a frame-like structure. Furthermore, this FIG. 3 shows that, as seen in the longitudinal direction of the quay 3, the length of the transfer point 14 is adapted to the length of the ISO containers 2. The same is true for the transport vehicles 15 with their lifting elements 15a. The transport vehicle 15 has two lifting elements 15a disposed one behind the other as seen in the travel direction thereof, in order thereby to be able to handle ISO containers 2 with a 20-foot length independently of each other. For longer ISO containers 2 with a 40-foot length or 45-foot length, the two lifting elements 15a are raised or lowered in synchronism.

FIG. 4 shows an enlargement of a section of FIG. 1 from the region of an intermediate storage point 13. It can be seen that podium-like bearing elements 13a are disposed on the intermediate storage point 13 disposed in a cantilever-like manner on the sea-side supports 8a of the gantry frame 8, the upper bearing surface of which bearing elements is dimensioned such that, like the lifting elements 15a of the transport vehicles 15, these are narrower than an ISO container 2 so that an ISO container set down thereon does not lie with its lateral edge regions and corners on the bearing elements 13a. Therefore a worker can attach or remove the twistlocks at the lower corners of ISO containers 2 in order to stack the ISO containers 2.

FIG. 5 shows a side view of FIG. 4. This again shows the cuboidal bearing element 13a on which an ISO container 2 is set down for intermediate storage.

REFERENCE LIST 1 cargo handling system
2 ISO container
3 quay
4 ship
5 port basin
6 container crane
7 loading and unloading area
8 gantry frame
8a sea-side support
8b land-side support
8c travelling mechanisms
10 first travelling crane
10a first crane boom
10b first crane trolley
10c sea-side portion
10d land-side portion
10e first load-receiving means
11 travel region
12 second travelling crane
12a second crane boom
12b second crane trolley
12c gantry-side portion
12d loading area-side portion
12e second load-receiving means
13 intermediate storage area
13a bearing elements
14 transfer point
14a support arms
14b bearing arms
15 transport vehicle
15a lifting element
a longitudinal extension of the transfer point 14
l longitudinal direction of the second crane boom 12a

The invention claimed is:

1. Cargo handling system for ISO containers with a container crane bridge and a loading and unloading area adjoining the container crane bridge, into and out of which area transport vehicles for ISO containers can travel, in which the container crane bridge has a first travelling crane with a first crane boom on which a first crane trolley with a first load-receiving means can travel between a sea-side portion and a land-side portion of the first crane boom, and has a second travelling crane with a second crane boom which is disposed below the land-side portion of the first crane boom and on which a second crane trolley with a second load-receiving means can travel, wherein ISO containers can be transferred between the first travelling crane and the second travelling crane, wherein a passive transfer point for an ISO container is disposed on the second crane boom, and the ISO container can be transferred between the transfer point and a transport vehicle standing in the loading and unloading area, the transfer point comprises L-shaped support arms which are suspended on the second crane boom and have a fixed and immovable bearing arm in the region of their ends remote from the second crane boom, on which bearing arms an ISO container set down in the transfer point stands, wherein the bearing arms permanently block further lowering of an ISO container set down on the bearing arms in the transfer point, and the transport vehicle has a lifting element with which the ISO container can be raised from the transfer point or lowered onto the transfer point, wherein the lifting element is formed as a lifting platform, the transport vehicle with a lowered and empty lifting element can travel under the transfer point, the lowered lifting element can be raised to lift the ISO container from the bearing arms and to carry the ISO container, the transfer point and its L-shaped support arms are configured so that the transport vehicle with a raised lifting element with an ISO container can travel out of the transfer point or the ISO container can be moved into the transfer point by the transport vehicle with a raised lifting element and the ISO container is thus located above the bearing arms and in order to set down the ISO container on the bearing arms the lifting element can be lowered.

2. Cargo handling system as claimed in claim 1, wherein the container crane bridge can travel along rails in the longitudinal direction of the quay and the transfer point is orientated with its longitudinal extension in the longitudinal direction of the quay.

3. Cargo handling system as claimed in claim 1, wherein the second crane boom has a gantry-side portion facing the sea-side portion of the first crane boom and an adjoining loading area-side portion, and the transfer point in the loading area-side portion of the second crane boom is attached to the second crane boom.

4. Cargo handling system as claimed in claim 1, wherein a plurality of transfer points are suspended next to each other on the second crane boom as seen in the longitudinal direction of the quay.

5. Cargo handling system as claimed in claim 1, wherein the region of the second travelling crane and below the second crane boom at least one intermediate storage point for ISO containers is disposed, onto or from which ISO containers can be set down or picked up by the first travelling crane and the second travelling crane.

6. Cargo handling system as claimed in claim 1, wherein the second crane boom has a gantry-side portion facing the sea-side portion of the first crane boom and an adjoining loading area-side portion, and the transfer point in the loading area-side portion of the second crane boom is attached to the second crane boom.

7. Cargo handling system as claimed in claim 6, wherein a plurality of transfer points are suspended next to each other on the second crane boom as seen in the longitudinal direction of the quay.

8. Cargo handling system as claimed in claim 7, wherein the region of the second travelling crane and below the second crane boom at least one intermediate storage point for ISO containers is disposed, onto or from which ISO containers can be set down or picked up by the first travelling crane and the second travelling crane.

9. Cargo handling system as claimed in claim 2, wherein a plurality of transfer points are suspended next to each other on the second crane boom as seen in the longitudinal direction of the quay.

10. Cargo handling system as claimed in claim 3, wherein a plurality of transfer points are suspended next to each other on the second crane boom as seen in the longitudinal direction of the quay.

11. Cargo handling system as claimed in claim 2, wherein the region of the second travelling crane and below the second crane boom at least one intermediate storage point for ISO containers is disposed, onto or from which ISO containers can be set down or picked up by the first travelling crane and the second travelling crane.

12. Cargo handling system as claimed in claim 3, wherein the region of the second travelling crane and below the second crane boom at least one intermediate storage point for ISO containers is disposed, onto or from which ISO containers can be set down or picked up by the first travelling crane and the second travelling crane.

13. Cargo handling system as claimed in claim 4, wherein the region of the second travelling crane and below the second crane boom at least one intermediate storage point for ISO containers is disposed, onto or from which ISO containers can be set down or picked up by the first travelling crane and the second travelling crane.

* * * * *